US011962032B2

(12) United States Patent
Bergery et al.

(10) Patent No.: US 11,962,032 B2
(45) Date of Patent: Apr. 16, 2024

(54) ANTI-PROPAGATION EXHAUST DEVICE FOR AIRCRAFT LITHIUM-ION BATTERIES

(71) Applicant: AIRBUS DEFENCE AND SPACE SAS, Toulouse (FR)

(72) Inventors: Julien Bergery, Toulouse (FR); Dimitry Loubere, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/783,526

(22) PCT Filed: Jul. 27, 2021

(86) PCT No.: PCT/FR2021/051398
§ 371 (c)(1),
(2) Date: Jun. 8, 2022

(87) PCT Pub. No.: WO2022/029380
PCT Pub. Date: Feb. 10, 2022

(65) Prior Publication Data
US 2023/0011662 A1 Jan. 12, 2023

(30) Foreign Application Priority Data

Aug. 5, 2020 (FR) ..................................... 20 08293

(51) Int. Cl.
*H01M 50/342* (2021.01)
*H01M 10/0525* (2010.01)

(52) U.S. Cl.
CPC .... *H01M 50/3425* (2021.01); *H01M 10/0525* (2013.01); *H01M 2200/20* (2013.01); *H01M 2220/20* (2013.01)

(58) Field of Classification Search
CPC ......... H01M 50/3425; H01M 10/0525; H01M 2200/20; H01M 2220/20; Y02E 60/10
(Continued)

(56) References Cited

U.S. PATENT DOCUMENTS

2008/0318121 A1  12/2008  Takagi
2013/0196212 A1*  8/2013  Pan ...................... H01M 4/134
                                                        429/339
(Continued)

FOREIGN PATENT DOCUMENTS

DE    10 2013 203 601    9/2014
DE    20 2016 001 797    5/2016
EP         2 942 226     11/2015

OTHER PUBLICATIONS

French International Search Report and English translation for PCT/FR2021/051398, six pages, dated Oct. 26, 2021.
(Continued)

*Primary Examiner* — Gary D Harris
(74) *Attorney, Agent, or Firm* — Nixon & Vanderhye P.C.

(57) ABSTRACT

An assembly for supplying power to an aircraft is disclosed having at least one battery housed in a respective housing, each housing comprising a wall in which a through-opening is arranged, and an exhaust device including a discharge duct connecting each housing opening to a common discharge port, a valve mounted on each opening. Each valve includes a membrane arranged so as to seal the opening closed and having a surface of pressure application towards the inside of the housing and a surface of pressure application towards the outside of the housing. The surface of pressure application towards the outside of the housing is larger than the surface of pressure application towards the inside of the housing, so that the membrane bursts at a bursting pressure inside the housing that is lower than a bursting pressure reached outside the housing.

11 Claims, 3 Drawing Sheets

(58) Field of Classification Search
USPC .......................................................... 429/56
See application file for complete search history.

(56) References Cited

U.S. PATENT DOCUMENTS

| | | | |
|---|---|---|---|
| 2014/0170446 A1* | 6/2014 | Elian | G01M 3/3272 |
| | | | 73/49.3 |
| 2014/0242423 A1 | 8/2014 | Jones | |
| 2014/0242896 A1 | 8/2014 | Plessner et al. | |
| 2014/0272479 A1 | 9/2014 | Turbe et al. | |
| 2015/0340673 A1* | 11/2015 | Joswig | H01M 50/394 |
| | | | 429/56 |
| 2019/0162340 A1 | 5/2019 | Harmuth et al. | |

OTHER PUBLICATIONS

French Written Opinion of the ISA for PCT/FR2021/051398, six pages, dated Oct. 26, 2021.

* cited by examiner

ANTI-PROPAGATION EXHAUST DEVICE FOR AIRCRAFT LITHIUM-ION BATTERIES

CROSS REFERENCE TO RELATED APPLICATIONS

The present application is a National Phase of International Application Number PCT/FR2021/051398 filed Jul. 27, 2021, which designated the U.S. and claims priority benefits from French Application Number FR20 08293 filed Aug. 5, 2020, the entire contents of each of which are hereby incorporated by reference.

TECHNICAL FIELD

This disclosure relates to an exhaust device for aircraft batteries, in particular in the event of thermal runaway of one or more batteries.

PRIOR ART

Currently, aircraft which carry passengers do not have lithium batteries, but Ni-Cad batteries which are not subject to the risk of thermal runaway. For an aircraft to be able to carry lithium batteries, it must comply with DO311A certification, which involves setting up a discharge system between each battery and the outside of the aircraft so that, in the event of thermal runaway of a battery, the generated gases are discharged outside the aircraft. This discharge system must comply with pressure and high-temperature resistance constraints.

However, if the aircraft carries several batteries, for reasons of size, weight, and design difficulties it is not desirable to provide one discharge device per battery on board the aircraft. In addition, to obtain certification, it is necessary to provide a discharge device with high reliability.

SUMMARY

In view of the above, one object of the invention is to provide a device for discharging the gases generated in the event of thermal runaway of a battery on board an aircraft, which is shared by several batteries, with no risk of thermal runaway contamination between batteries.

Another object of the invention is to provide a device having high reliability.

To this end, the invention proposes an exhaust device for at least one battery housed in at least one housing and mounted in an aircraft, each housing comprising a wall in which is arranged a through-opening, the device comprising:
  a discharge duct connecting the opening of each housing to a common discharge port leading to outside the aircraft,
  a check valve mounted on the opening of each housing, wherein each check valve comprises a membrane mounted on the wall of each housing in which the through-opening is arranged, so as to seal closed said opening, each membrane having a surface of pressure application towards the inside of the housing and a surface of pressure application towards the outside of the housing,
and wherein the surface of pressure application towards the outside of the housing is larger than the surface of pressure application to the inside of the housing, so that the membrane bursts at an internal bursting pressure value reached inside the housing that is lower than an external bursting pressure value reached outside the housing.

In some embodiments, the surface of pressure application of each membrane towards the inside is less than or equal to one third of the surface of pressure application towards the outside of the housing.

In some embodiments, each membrane is located outside the housing and the surface of pressure application of the membrane towards the outside is equal to the internal cross-section of the discharge duct.

In some embodiments, the device may further comprise a membrane support in contact with a main face of the membrane oriented towards the inside of the housing, and shaped to reduce the surface of pressure application towards the inside of the housing.

In some embodiments, each membrane support comprises a set of bars extending parallel to the membrane and transversely to each other.

In some embodiments, each membrane support is formed of a grid or a cross.

In some embodiments, each valve comprises an endpiece for connection to the discharge duct, the endpiece being attached to the wall of the housing in which the through-opening is arranged, and the membrane being interposed between the endpiece and the wall.

In some embodiments, each valve comprises an endpiece for connection to the discharge duct, the endpiece comprising a first portion suitable for insertion into the through-opening and a second portion forming a peripheral shoulder suitable for resting against an edge of the through-opening, the membrane being housed inside the endpiece which rests against the peripheral shoulder.

In some embodiments, each membrane is formed of silicone.

In some embodiments, the device may further comprise a sensor arranged on each membrane and suitable for detecting an open or closed state of each membrane.

In some embodiments, the device connects between one and six housings to the common discharge port.

In some embodiments, the device further comprises a pressure relief valve mounted on the common discharge port and suitable for closing off this port as long as the pressure in the discharge duct is lower than a threshold pressure value that is less than the external bursting pressure of the membranes, and to allow fluid communication to the outside of the aircraft when the pressure in the discharge duct reaches said threshold pressure.

In this case, a method implemented by such a device comprises, in the event of an increase in pressure in a battery housing,
  the bursting of the membrane of said battery housing when the pressure therein reaches the internal bursting pressure value inside the housing, and the escape of gas contained in the battery housing into the discharge duct, and
  the opening up of the common discharge port by the pressure relief valve when the pressure in the discharge duct reaches the threshold pressure value which is less than the external bursting pressure of the other housings, to allow the discharge of gases to outside the aircraft.

According to another object, an assembly for supplying power to an aircraft is described comprising a plurality of batteries mounted in an aircraft, the batteries being housed in a plurality of housings, each housing comprising a wall in which a through-opening is arranged, the assembly further comprising an exhaust device for the batteries according to the above description.

In some embodiments, the batteries (2) are lithium batteries.

The device described herein allows connecting a set of batteries, in particular lithium batteries, to a single discharge port that leads to outside the aircraft, with no moving parts. To achieve this, the valve mounted on each battery housing allows gases generated during a potential thermal runaway of a battery to escape to the discharge port, since the membrane of the valve yields to the pressure applied by these gases, without the membranes of the valves of the other batteries yielding under this pressure. The risk of thermal runaway contagion between batteries is therefore eliminated.

The device also offers advantages in the case of a single battery, since the membrane, which seals the battery housing, makes it possible to form a fluidtight barrier which eliminates the need to use a temporary plugging device to prevent the entry of objects or liquids into the battery housing, in particular in the event of assembly or maintenance.

In the case where a membrane further comprises a sensor which allows detecting a rupture of the membrane, this sensor can provide an additional indication to a battery management device in order to know the state of the battery or batteries contained in the housing closed off by the membrane.

BRIEF DESCRIPTION OF DRAWINGS

Other features, details, and advantages will become apparent upon reading the detailed description below, and upon analyzing the appended drawings, on which.

DESCRIPTION OF EMBODIMENTS

Figure 1:
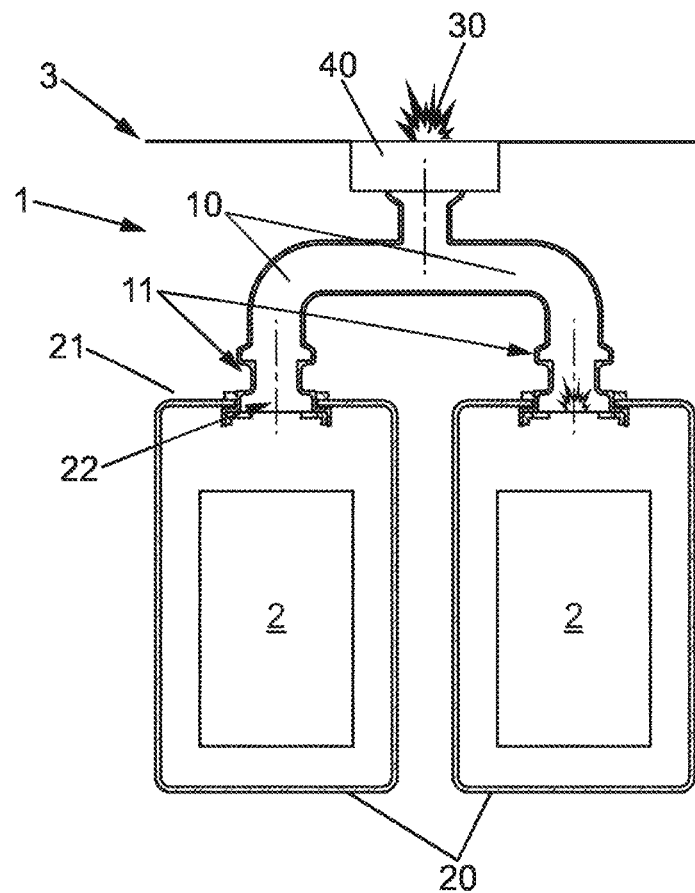
FIG. 1 shows an exhaust device for a plurality of batteries, according to one embodiment.

Reference is now made to FIG. 1, which shows an example of an assembly for supplying power to an aircraft, comprising a plurality of batteries 2 mounted in an aircraft 3, and an exhaust device 1 for the batteries. The batteries may be lithium batteries, in particular batteries of the LFP or NMC type. In addition, the batteries may have a cylindrical, prismatic, or pouch cell format (i.e. in a bag or case). The aircraft in which the batteries 2 and the exhaust device 1 are mounted may be for example an airplane for civil or commercial applications, a helicopter, a flying taxi type of autonomous vehicle, a space shuttle, or any other aircraft, in particular intended for passenger transport applications.

Each battery 2 is housed in a housing suitable for containing the flames and gases generated in the event of thermal runaway of the battery. For example, each battery housing 20 may be formed of aluminum. In one embodiment, each battery 2 is housed in a respective housing. Alternatively, a housing may house several batteries, for example two batteries.

As described in more detail below, the exhaust device 1 makes it possible to connect a plurality of battery housings 20, and therefore a plurality of batteries, to a common discharge port 30 arranged in a wall of the aircraft and leading to outside the aircraft. In some embodiments, the exhaust device makes it possible to connect at least one housing 20 for batteries 2 to the discharge port 30, and preferably between 1 and 6 housings. In the case where each housing houses one battery, the device thus makes it possible to connect between 1 and 6 batteries to the discharge port 30.

Each housing 20 comprises a wall 21 in which is arranged a through-opening 22. The exhaust device 1 comprises, for each housing 20, a discharge duct 10 connecting the through-opening 22 of the housing 20 to the discharge port 30. The discharge ducts therefore comprise a portion specific to each battery housing 20 and a portion common to all of the battery housings, and all of the discharge ducts are in communication with one another so that gases can freely circulate in all the discharge ducts. The exhaust device further comprises a valve 11 for each battery housing 20, carried at the housing end of each discharge duct 10 and mounted on the through-opening 22 of the housing.

Figure 2A:
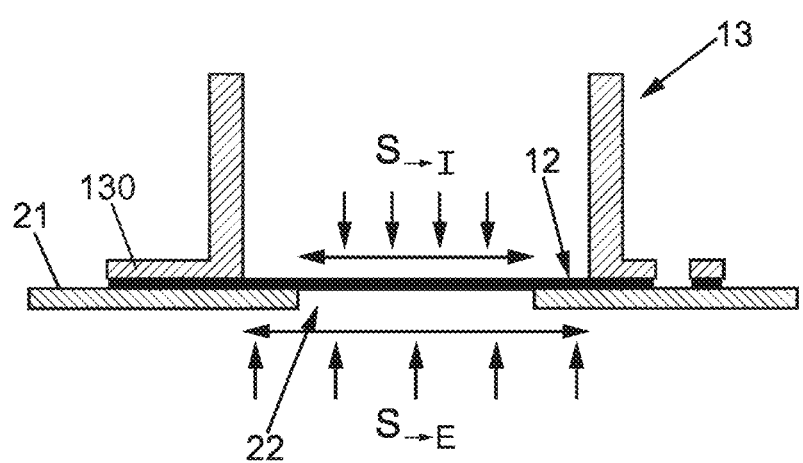
FIG. 2a shows a cross-sectional view of a valve of an exhaust device according to one embodiment.
Figure 2B:
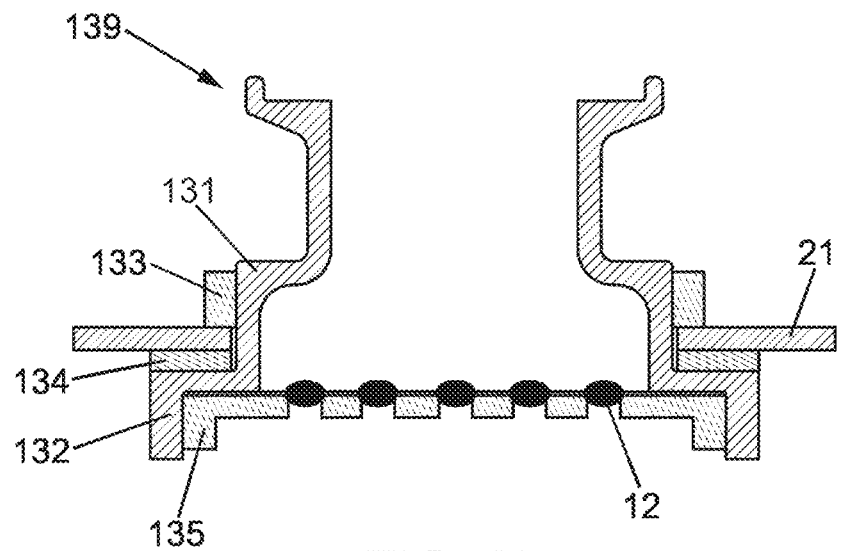
FIG. 2b shows a cross-sectional view of a valve of an exhaust device according to one embodiment.
Figure 2C:
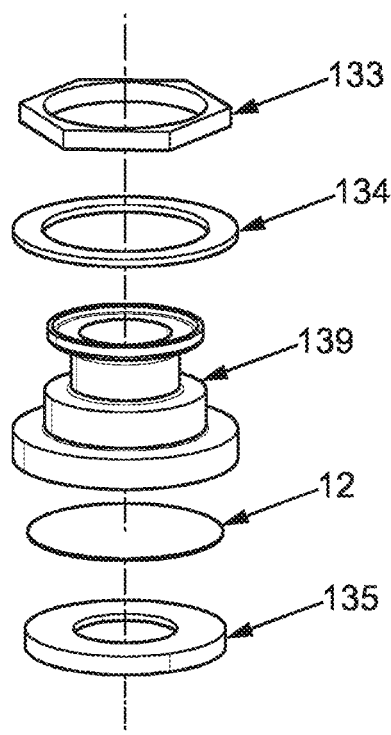
FIG. 2c shows an exploded view of the valve shown in FIG. 2b.

Referring to FIGS. 2a to 2c, the valve 11 comprises a membrane 12, mounted on the wall 21 of the housing so as to seal closed the through-opening 22 of the housing. The membrane is made of a fluidtight material that is non-flammable. For example, the membrane may be made of silicone. Alternatively, it may also be formed of a metal strip. In addition to the function described below, the fact that the membrane seals the through-opening makes it possible to ensure that the housing is fluidtight. As a result, the fluidtightness of the housing is guaranteed, including during assembly or maintenance operations, eliminating the need for a temporary plugging device.

The valve 11 may also comprise a connection endpiece, suitable for receiving one end of a discharge duct, so as to connect the through-opening 22 of the housing with the duct 10.

The valve is adapted so that the membrane 12 is able to withstand an external pressure PE on the discharge duct side, meaning outside the housing that is greater than the internal pressure PI inside the housing of the battery. In particular, each valve is adapted so that the membrane 12 yields at an internal pressure PI within the battery housing 20 that is equal to a determined pressure P1, without yielding when this pressure P1 is reached, or even exceeded, by the pressure PE in the discharge duct. Preferably, each valve is adapted so that the membrane 12 has an internal bursting pressure $PI_B$ that is less than or equal to half, or even a third, of the external bursting pressure $PE_B$.

Each membrane 12 has a surface of pressure application towards the outside of the housing $S_{\to E}$ and a surface of pressure application towards the inside of the housing $S_{\to I}$. In the following, the surface of pressure application is the portion of the section of the membrane, which is less than or equal to the total surface of the membrane, on which is exerted a force resulting from a gas pressure according to the equation F=P.S. The surface of pressure application may be formed by several separate regions of the membrane section. Alternatively, it may be formed by a single region, which has a surface area less than or equal to the surface area of the membrane.

For example, the surface of pressure application of a main face of the membrane may correspond to the surface of the membrane that is free to deform under pressure. In an example in which the membrane is on the outside of the housing so as to cover the through-opening of the housing, the surface of pressure application towards the inside $S_{\to I}$ of the housing may correspond to the cross-section of the through-opening.

Depending on the geometry of the exhaust device 1 on either side of the membrane, the surfaces of pressure application towards the inside $S_{\to I}$ and towards the outside $S_{\to E}$ of the membrane may therefore be different.

In order for the membrane 12 to be able to withstand, on the discharge duct side, a pressure greater than the pressure $PI_B$ exerted inside the housing at which it yields, the geometry of the membrane 12 is adapted so that the surface of pressure application towards the outside of the housing $S_{\to E}$ is larger than the surface of pressure application $S_{\to I}$ towards the inside of the housing. In this manner, at identical pressure on either side of the membrane, the force exerted by gases on the membrane 12 is greater towards the outside than towards the inside, which causes the membrane to rupture at an internal bursting pressure $PI_B$ reached inside the housing 20 that is less than a bursting pressure $PE_B$ in the discharge duct 10. In some embodiments, the section of pressure application towards the inside $S_{\to I}$ is less than or equal to half or even a third of the section of pressure application towards the outside $S_{\to E}$, to allow a sufficient difference in pressure between the pressures that can be withstood on either side of the membrane.

In some embodiments, the membrane 12 may be located outside the housing 20, and cover the through-opening 22 so as to close off this opening. With reference to FIG. 2a, in this embodiment, the surface of pressure application $S_{\to I}$ towards the inside of the housing may correspond to the cross-section of the through-opening 20 of the housing. On the other hand, the surface of pressure application $S_{\to E}$ towards the outside of the housing corresponds to the internal cross-section of the discharge duct 10, this cross-section advantageously being greater than the cross-section of the through-opening, and preferably at least twice the cross-section of the through-opening.

Figure 4:
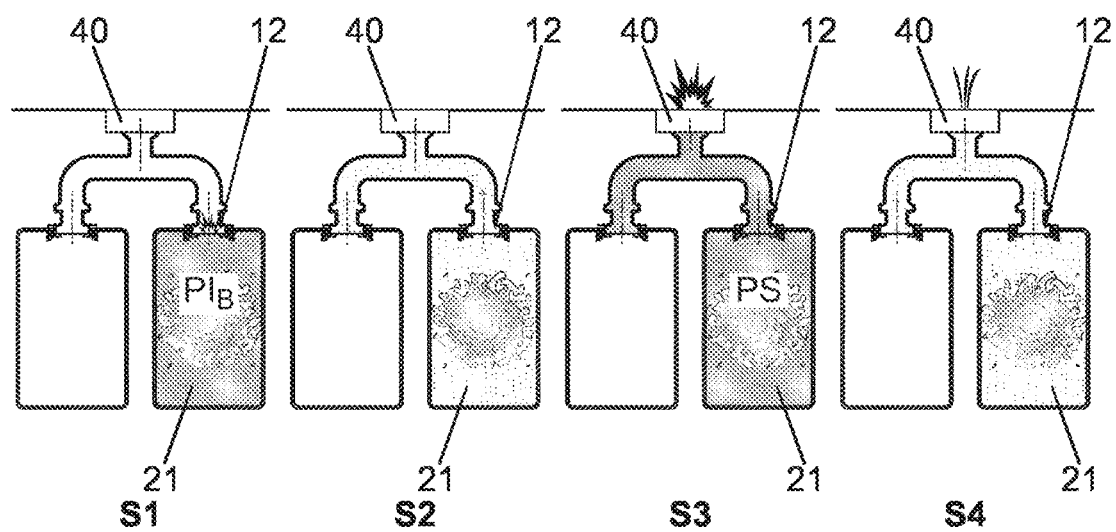
FIG. 4 schematically represents an example of the kinematics in the event of thermal runaway of a battery.

In the example shown in FIGS. 2a and 4, this embodiment can be obtained by pinching the membrane 12 between the connection endpiece of the valve and the wall 21 of the housing. The connection endpiece 13 is suitable for attachment to the wall of the housing in which the through-opening is arranged, for example by means of a mounting plate 130. The connection endpiece can then be attached to the housing, for example by screwing or by bolting the mounting plate to the wall 21 of the housing. The membrane 12 is then interposed between the wall of the housing and the end of the connection endpiece formed by the mounting plate 130, so as to close off the opening in a sealed manner, without any need to add an additional gasket.

In other embodiments, the membrane 12 may be an element integrated into the connection endpiece of the valve.

According to an exemplary embodiment shown in FIGS. 2b and 2c, the connection endpiece 13 comprises a main body 139 comprising a portion 131 suitable for insertion into the through-opening 22 of the housing 20, and an adjacent portion 132 of greater diameter, forming a peripheral shoulder suitable for resting against an edge of the through-opening 22. In this case, the connection endpiece 13 can be fixed rigidly to the wall of the housing by bolting the peripheral shoulder to the wall of the housing, or in the case where the portion 131 inserted into the through-opening projects beyond the wall of the housing, by tightening a nut 133 around the projecting portion. A gasket 134 may be provided between the peripheral edge of the connection endpiece and the wall of the housing. The membrane 12 may itself be held in place in the connection endpiece, resting on the peripheral shoulder, by another clamping nut 135.

In the example shown in FIG. 2b, the peripheral shoulder of the connection endpiece 13 is located inside the housing 20, and the membrane 12 is therefore also inside the housing. Alternatively, the reverse configuration could be adopted and the membrane 12 would then be outside the housing.

In addition, to further reduce a membrane's surface of pressure application towards the inside relative to the surface of pressure application towards the outside, each valve may comprise a membrane support 14 located on the side of the membrane located inside the housing. The membrane support 14 is preferably in contact with the main face of the membrane oriented towards the inside of the housing. The membrane support 14 is shaped to reduce the surface of pressure application towards the inside of the housing by reducing the surface of the membrane that is free to deform inward.

The membrane support 14 may be formed of one or more bars extending parallel to the membrane and transversely to each other. For example, the membrane support may be formed of a cross or a grid extending in a plane parallel to the plane of the membrane and in contact with the membrane. The membrane support therefore makes it possible to reduce the membrane's surface of pressure application towards the inside and to increase the difference between the internal bursting pressure PI and the external bursting pressure PE of the membrane.

In the example of FIG. 2b, a membrane support is shown, this nut being a grid formed as one piece with the nut holding the membrane in place in the connection endpiece.

Figure 3:
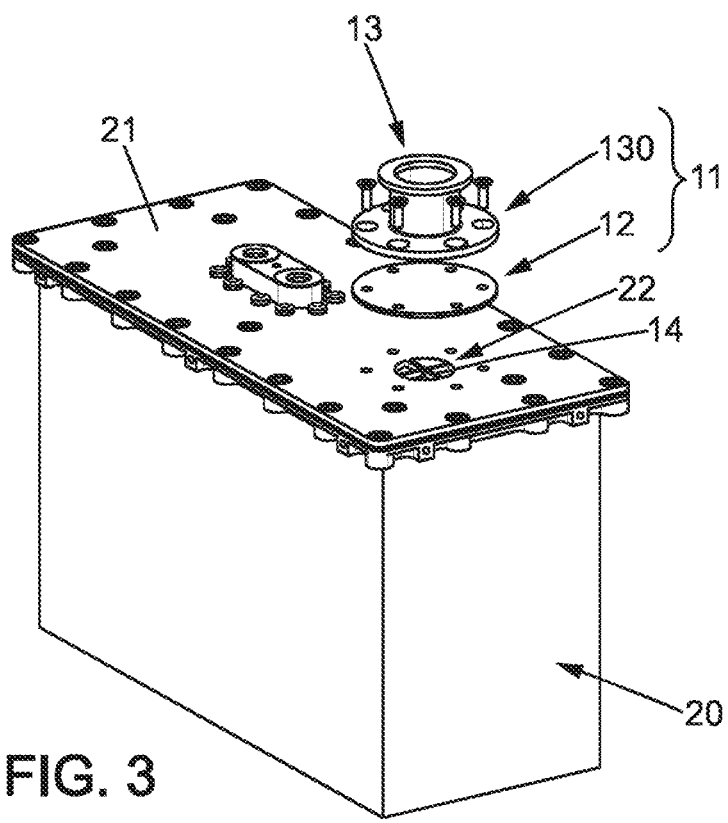
FIG. 3 shows an example of an assembly of a valve on a battery housing.

In one embodiment, the membrane support 14 may be formed integrally with the wall 21 of the housing in which the through-opening 22 is made. This is the case in the example shown in FIG. 3. Alternatively, the membrane support 14 may be a separate part attached to the wall of the housing or to one of the components of the valve 11. For example, in the embodiment shown in FIG. 2b, the support is formed integrally with the clamping nut 135 keeping the membrane 12 integral with the body 139 of the endpiece for connection to the discharge duct.

In some embodiments, a sensor (not shown) may be arranged on the membrane, suitable for detecting a closed or open (burst) state of the membrane. The sensor may be, for example but not limited thereto, of the strain gauge type, break wire type, etc. In addition, the sensor may then be connected to a device for managing the battery or batteries (or BMS, acronym for Battery Management System) that are contained in each housing, so that the battery management device can have access to additional information about the state of the membrane.

Referring to FIG. 1 and FIG. 4, the device further comprises a pressure relief valve 40 mounted on the discharge port common to all the battery housings, or, if not mounted directly on the discharge port, it is arranged on a common portion of the set of discharge ducts.

The pressure relief valve is suitable for closing off the discharge port as long as the pressure inside the discharge ducts is below a threshold pressure $P_S$, and for opening up this port, for example by bursting, when the pressure reaches or exceeds the threshold pressure.

Advantageously, the threshold pressure $P_S$ is less than the external bursting pressure $PE_B$ of the membranes of the valves mounted on the housings. In addition, the threshold pressure is advantageously less than or equal to the internal bursting pressure $PI_B$ of these membranes, so that in the event of thermal runaway of a battery, the corresponding membrane of the housing bursts, and consequently the pressure relief valve also opens up the discharge port. For example, the threshold pressure PS may be equal to pressure $PI_B$.

Thus, FIG. 4 shows some kinematics allowed by the exhaust device 1 presented above in the event of thermal runaway of a battery. During a first step S1, a battery undergoes thermal runaway, causing the generation of gas and an increase in pressure in the battery housing, until the internal bursting pressure $PI_B$ of the membrane is reached, for example two bars.

During a second step S2, the membrane of the housing bursts, which causes the gases to spread through all of the discharge ducts of the exhaust device and an increase in pressure in these ducts.

During a third step S3, the pressure in the discharge ducts reaches the threshold pressure PS where the pressure relief valve 40 opens up the discharge port 30. This threshold pressure is lower than the external pressure $PE_B$ at which the membranes of the other housings 20 give way. Consequently, the discharge port 30 is opened up to allow discharging the gases without contaminating the other batteries with thermal runaway.

During a final step S4, the gases are discharged to outside the aircraft and the pressure in the discharge ducts decreases, without having reached the external bursting pressure $PE_B$ of the other membranes, and therefore the risk of thermal runaway is eliminated.

LIST OF REFERENCE SYMBOLS

1: exhaust device,
10: discharge duct,
11: valve,
12: membrane
13: connection endpiece,
130: mounting plate,
131: portion that can be inserted into the opening in the housing,
132: portion forming a shoulder,
133: nut,
134: gasket,
135: membrane clamping nut,
139: main body of the endpiece,
14: membrane support,
2: battery,
20: battery housing,
21: housing wall,
22: opening in the wall 21,
3: aircraft,
30: discharge port,
40: pressure relief valve,
$S_{\rightarrow E}$: membrane surface of pressure application towards the outside of the housing,
$S_{\rightarrow i}$: membrane surface of pressure application towards the inside of the housing.

The invention claimed is:

1. An assembly for supplying power to an aircraft, comprising: a plurality of housings, each housing a respective battery, each housing being suitable for being carried on board an aircraft and comprising a wall in which a through-opening is arranged, and an exhaust device, comprising:
a discharge duct suitable for connecting the opening of each housing to a discharge port common to all housings, the common discharge port leading to outside the aircraft,
a plurality of first valves, each mounted on the opening of a respective housing,
a pressure relief valve suitable for mounting on the common discharge port,
wherein each first valve comprises a membrane mounted on the wall of each housing in which the through-opening is arranged, so as to seal closed said opening, and is configured to burst when a pressure exerted on the membrane inside the housing exceeds an internal bursting pressure valve, or when the pressure exerted on the membrane outside the housing exceeds an external bursting pressure value,
wherein the internal bursting pressure value is lower than the external bursting pressure, and
wherein the pressure relief valve is configured to close off the common discharge port as long as the pressure in the discharge duct is lower than a threshold pressure value that is less than the external bursting pressure of the first membranes, and to allow fluid communication to the outside of the aircraft when the pressure in the discharge duct reaches said threshold pressure.

2. The assembly according to claim 1, wherein the surface of pressure application of each membrane towards the inside is less than or equal to one third of the surface of pressure application towards the outside of the housing.

3. The assembly according to claim 1, wherein each membrane is located outside the housing and the surface of pressure application of the membrane towards the outside is equal to the internal cross-section of the discharge duct.

4. The assembly according to claim 1, wherein the exhaust device further comprises a membrane support in contact with a main face of the membrane oriented towards the inside of the housing, and shaped to reduce the surface of pressure application towards the inside of the housing.

5. The assembly according to claim 4, wherein each membrane support comprises a set of bars extending parallel to the membrane and transversely to each other.

6. The assembly according to claim 1, wherein each valve comprises an endpiece for connection to the discharge duct, the endpiece being attached to the wall of the housing in which the through-opening is arranged, and the membrane being interposed between the endpiece and the wall.

7. The assembly according to claim 1, wherein each valve comprises an endpiece for connection to the discharge duct, the endpiece comprising a first portion suitable for insertion into the through-opening and a second portion forming a peripheral shoulder suitable for resting against an edge of the through-opening, the membrane being housed inside the endpiece which rests against the peripheral shoulder.

8. The assembly according to claim 1, wherein each membrane is formed of silicone.

9. The assembly according to claim 1, wherein the exhaust device further comprises a sensor arranged on each membrane and suitable for detecting an open or closed state of each membrane.

10. An aircraft comprising an assembly for supplying power according to claim 1 and a common discharge port, each battery of the assembly for supplying power being connected to the common discharge port by the discharge duct of the exhaust device.

11. A method implemented by the assembly according to claim 1, comprising, in the event of an increase in pressure in a battery housing, the bursting of the membrane of said battery housing when the pressure therein reaches the internal bursting pressure value inside the housing, and the escape of gas contained in the battery housing into the discharge duct, and the opening up of the common discharge port by the pressure relief valve when the pressure in the discharge duct reaches the threshold pressure value which is less than the external bursting pressure of the other housings, to allow the discharge of gases to outside the aircraft.

* * * * *